(12) United States Patent
Adas et al.

(10) Patent No.: US 8,287,272 B1
(45) Date of Patent: Oct. 16, 2012

(54) INJECTION MOLDING APPARATUS HAVING A NOZZLE RETAINING CLIP

(75) Inventors: James Oliver Adas, Clinton Township, MI (US); Trevor Pruden, Windsor (CA); Craig Vincent Kovacic, Imlay City, MI (US)

(73) Assignee: DME Company LLC, Madison Heights, MI (US)

( * ) Notice: Subject to any disclaimer, the term of this patent is extended or adjusted under 35 U.S.C. 154(b) by 88 days.

(21) Appl. No.: 13/076,611

(22) Filed: Mar. 31, 2011

(51) Int. Cl.
*B29C 45/20* (2006.01)
(52) U.S. Cl. .................................... 425/572; 264/328.8
(58) Field of Classification Search .................. 425/572, 425/588; 264/328.8
See application file for complete search history.

(56) References Cited

U.S. PATENT DOCUMENTS

| | | | |
|---|---|---|---|
| 4,921,708 A | 5/1990 | Gellert | |
| 5,227,179 A * | 7/1993 | Benenati | 425/547 |
| 5,383,689 A * | 1/1995 | Wolfe, Sr. | 285/124.3 |
| 6,062,846 A | 5/2000 | Kalemba | |
| 6,162,043 A * | 12/2000 | Gellert | 425/549 |
| 6,860,732 B2 * | 3/2005 | Babin et al. | 425/549 |
| 7,189,071 B2 * | 3/2007 | Olaru | 425/563 |
| 7,329,118 B2 * | 2/2008 | Pruden et al. | 425/563 |
| 2005/0184430 A1 * | 8/2005 | Feick | 264/255 |
| 2007/0237854 A1 * | 10/2007 | Yu | 425/572 |

OTHER PUBLICATIONS

Kurt Gauler and John Bundy, "Unitized Hot Runner Systems Reduce Errors and Save Time", MoldMaking Technology, Jan. 1, 2004.

* cited by examiner

*Primary Examiner* — Tim Heitbrink
(74) *Attorney, Agent, or Firm* — John W. Gregg

(57) ABSTRACT

A nozzle retaining clip for retaining a nozzle assembly with a material distributing manifold comprises an attachment portion for attaching the clip to the manifold and an engagement portion for engaging a nozzle assembly abutted to the manifold. Two clips located to engage opposite sides of a nozzle assembly abutted to the manifold member are effective to retain the nozzle assembly and to allow the manifold and nozzle assembly to move relative to one another while the clips and nozzle assembly remain engaged. A first alternative clip achieves only surface contact and a second alternative clip allows protrusion of a segment of a nozzle assembly periphery through the clip. Advantageously, the clip comprises at least one locating tap to restrain movement of the clip relative to a manifold. An apparatus for injection molding comprises a manifold and nozzle assembly construction comprising clips in accordance with the invention.

16 Claims, 5 Drawing Sheets

INJECTION MOLDING APPARATUS HAVING A NOZZLE RETAINING CLIP

BACKGROUND OF THE INVENTION

1. Field of the Invention

This invention relates generally to injection molding. In particular, this invention pertains to manifold and nozzle assembly constructions for facilitating assembly of mold components comprising a mold assembly.

2. Description of Related Art

It is known to provide injection molding equipment comprising constructions of a manifold and associated nozzle assemblies wherein nozzle assemblies are attached to a material distributing manifold to facilitate installation of the manifold and nozzle assembly in a mold assembly. As is known, components of a mold assembly include members to receive a manifold and members to receive at least a portion of at least one nozzle assembly and that further comprise a mold die element that defines at least a portion of a mold cavity. FIGS. 1a and 1b illustrate an example of a manifold and nozzle assembly construction and portions of a mold component in which such constructions are installed. Considering FIG. 1b, plates MP1 and MP2 define a space in which a manifold block MB, comprising manifold and nozzle assembly construction MNA (FIG. 1a), is received. A mold retainer plate MP3 supports a mold die block MD comprising at least a portion of a mold cavity such as cavity space MC. Each nozzle assembly, such as nozzle assemblies NA1 and NA2, is partially received in a recess such as nozzle well WN in a mold die block such as mold die block MD.

Continuing with reference to FIGS. 1a and 1b, nozzle assemblies NA1 and NA2 are retained with manifold block MB by threaded retainers such as retaining nut RN1 (FIG. 1b). Retaining nut RN1 is at least partially received in nozzle receiving bore MR of manifold block MB and retains nozzle assembly NA1 so that sealing contact is achieved between the inlet end of nozzle assembly NA1 and the ceiling of receiving bore MR. Desired sealing contact of the nozzle inlet end face with the ceiling of nozzle receiving bore MR is achieved by compressive forces exerted by the threaded connection of retaining nut RN1 with manifold block MB. As shown in FIG. 1b, a passage PM within manifold block MB is in fluid communication with a nozzle passage PN (shown in phantom (dashed lines)) through a nozzle assembly NA1. The outlet of nozzle passage PN is in fluid communication with mold cavity space MC through an opening (so-called "gate" MG) in mold die block MD. In manifold and nozzle assembly constructions comprising more than one nozzle assembly, a connecting passage, such as passage PC, conveys material from manifold passage PM to nozzle passage PN. Nozzle assemblies such as nozzle assembly NA1 advantageously comprise tip elements such as nozzle tip member NT having a passage there-through in fluid communication with nozzle passage PN and from which material exits the nozzle assembly. Sealing contact is made between nozzle assembly NA1 and nozzle well WN proximate the nozzle tip to prevent material from exiting the mold die block through nozzle well WN.

It is to be understood that flowable condition of material within manifold block MB and nozzle assembly NA1 is achieved by maintaining manifold block MB and nozzle assembly NA1 at suitably elevated temperatures. To that end, heating elements may be provided such as nozzle heater NH surrounding the elongated shank of nozzle assembly NA1. Likewise, heating elements may be provided in manifold block MB. Heat transfer from manifold block MB and nozzle assembly NA1 to surrounding members is reduced by minimizing contact therebetween. Hence, manifold block MB is supported between plates MP1 and MP2 with spacers (not shown) and nozzle assembly NA1 is spaced apart from sidewalls of nozzle well WN by precisely locating nozzle receiving bores MR in manifold block MB.

Sealing contact between nozzle assembly NA1 and mold members is dependent, at least in part, on alignment of nozzle assembly NA1 relative to the mold members. In particular, substantial parallelism between the face of the nozzle end surrounding the nozzle inlet and the ceiling of receiving bore MR surrounding the outlet of connecting passage PC is effective to maintain sealing contact therebetween when nozzle assembly NA1 is abutted to the ceiling of receiving bore MR. Likewise, desired sealing contact between nozzle assembly NA1 and nozzle well WN is achieved by abutment of an element of the nozzle assembly, such as a nozzle flange NF. Provided the longitudinal centerline of nozzle assembly NA1 is substantially parallel to the longitudinal centerline of nozzle well WN, sealing contact between nozzle flange NF and the sidewall of nozzle well WN will be realized.

As indicated, an advantage of manifold and nozzle assembly constructions illustrated in FIGS. 1a and 1b is that they are susceptible of pre-assembly to facilitate installation in mold components. A disadvantage of such constructions arises in consequence of thermal expansion in use that can result in forces that tend to cause tilting of nozzle assemblies relative to other mold component members. By virtue of deliberate thermal isolation of manifold and nozzle assembly construction MNA, manifold block MB will undergo different thermal expansion than other members of the mold component as temperature of the mold component is raised to a desired operating temperature. Considering the arrangement illustrated in FIG. 1b, it will be understood that by virtue of attachment of nozzle assembly NA1 to manifold block MB by retaining nut RN1, nozzle assembly NA1 is fixed in position relative to manifold block MB. Furthermore, by virtue of contact of nozzle sealing flange NF with the sidewall of nozzle well WN, nozzle assembly NA1 is fixed in position relative to mold die bock MD. Under circumstances where thermal expansion of manifold block MB effects a change of position of receiving bore MR, (the change of position being illustrated in phantom (dashed lines) in FIG. 1b) a transverse force EF is applied to the inlet end of nozzle assembly NA1. Unless there is a corresponding change of position of nozzle well WN, a corresponding force will not be applied to nozzle sealing flange NF. Consequently, nozzle assembly NA1 is subjected to a moment (unequal forces applied to points on opposite sides of the longitudinal center of the nozzle assembly) that tends to tilt nozzle assembly NA1 relative to the longitudinal centerlines of manifold receiving bore MR and of nozzle well WN, such tilt being represented by angles AA and BB, respectively, of FIG. 1b. Such tilt can result in loss of sealing contact between nozzle assembly NA1 and one or both of manifold block MB and nozzle well WN.

In constructions where the extent of thermal expansion driven tilting of nozzle assemblies relative to other mold members can so impair sealing contact that operation is adversely affected, it is known to arrange the manifold and associated nozzle assemblies to permit relative movement therebetween. Such known arrangements rely on abutting contact of the inlet end face of a nozzle assembly with an opposed face of a manifold block so that the manifold block can slide relative to the nozzle assembly while desired sealing contact is maintained. Compressive force holds the nozzle assembly in abutting contact with the manifold block so as to maintain sealing contact under normal operating pressure of material being conveyed from the manifold to the nozzle. The compressive forces are achieved by means that engage only the nozzle assemblies or manifold block rather than by means engaging both the nozzle assemblies and the manifold. A disadvantage of such known constructions arises from the lack of attachment of nozzle assemblies with manifolds negating pre-assembly of such constructions to facilitate installation of the construction in a mold assembly. Hence, there remains a need to provide manifold and nozzle assembly constructions that allow for pre-assembly thereof to facilitate installation in mold members and that permit relative movement of nozzle assemblies and the associated manifold in use.

SUMMARY OF THE INVENTION

It is an object of the present invention to provide a clip for retaining a nozzle assembly with a material distributing manifold to facilitate installation of a pre-assembled construction of a manifold and nozzle assembly in a mold assembly component, wherein a pair of clips are located so that respective engagement portions thereof engage opposite sides of a nozzle assembly so as to retain the nozzle assembly with the manifold member in a manner that permits relative movement of the manifold and nozzle assembly.

It is a further object of the present invention to provide a clip for retaining a nozzle assembly with a material distributing manifold to facilitate installation of a pre-assembled construction of a manifold and nozzle assembly in a mold assembly component wherein the clip comprises an attachment portion and an engagement portion oblique to the attachment portion and at least the engagement portion is sufficiently resilient so that with a pair of clips attached to a manifold member so as to engage opposite sides of a nozzle assembly, elastic displacement of the engagement portions to accommodate the nozzle assembly therebetween produces sufficient force to retain the nozzle assembly with the manifold member.

It is a further object of the present invention to provide an apparatus for injection molding comprising a material distributing manifold, at least one nozzle assembly and at least one pair of nozzle retaining clips for retaining at least one nozzle assembly with the manifold, a nozzle assembly being held in abutting contact with the manifold by the pair of nozzle retaining clips so that the nozzle assembly and manifold can move relative to each other while abutted and while the pair of clips continue to engage the nozzle assembly.

Further objects and advantages of the invention shall be made apparent from the accompanying drawings and the following description thereof.

In accordance with the aforesaid objects the present invention provides a nozzle retaining clip for retaining a nozzle assembly with a material distributing manifold to facilitate installation of a pre-assembled construction of a manifold and nozzle assembly in a mold assembly component, the manifold comprising a manifold member comprising a manifold passage for conveying material in a flowable condition, each nozzle assembly comprising a nozzle passage there-through for conveying material from the manifold passage to a mold cavity, the nozzle retaining clip comprising an attachment portion by which the clip is attached to the manifold member, an engagement portion for engaging a nozzle assembly abutted to the manifold member and at least one locating tab for contacting a surface of the manifold member so as to restrain movement of the attachment portion relative to the manifold member, wherein a pair of nozzle retaining clips are locatable so that the respective engagement portions thereof engage opposite sides of a nozzle assembly abutted to the manifold member so as to allow the manifold member and nozzle assembly to move relative to one another while the engagement portions of the clips remain engaged with the nozzle assembly. Alternative designs for nozzle retaining clips in accordance with the invention contemplate engagement of the clips and a nozzle assembly by surface contact alone and, alternatively, by protrusion of a segment of the periphery of a nozzle assembly through the clips. An apparatus for injection molding comprises a manifold and nozzle assembly construction comprising clips in accordance with the invention.

DETAILED DESCRIPTION OF THE PREFERRED EMBODIMENT

The invention shall be illustrated with reference to preferred embodiments which shall be described in detail. It is not the intention of applicants that the invention be limited to the preferred embodiments.

Figure 1A:
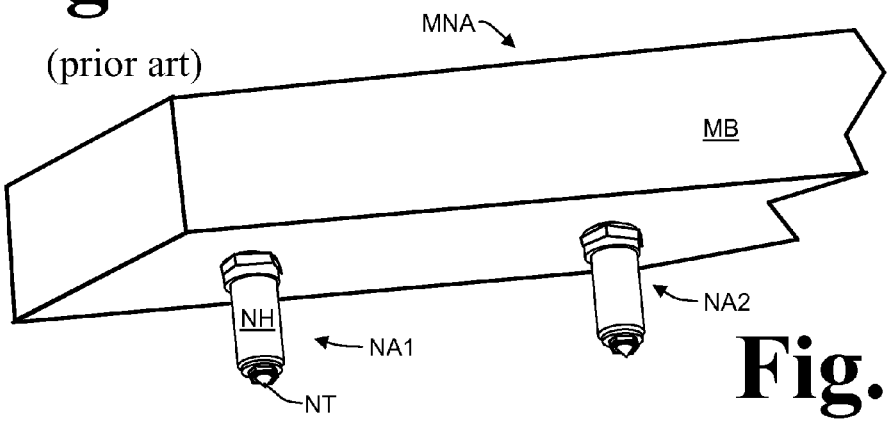
FIGS. 1*a* and 1*b* illustrate known manifold and nozzle assembly constructions where nozzle assemblies are attached to a manifold by treaded connections.
Figure 1B:
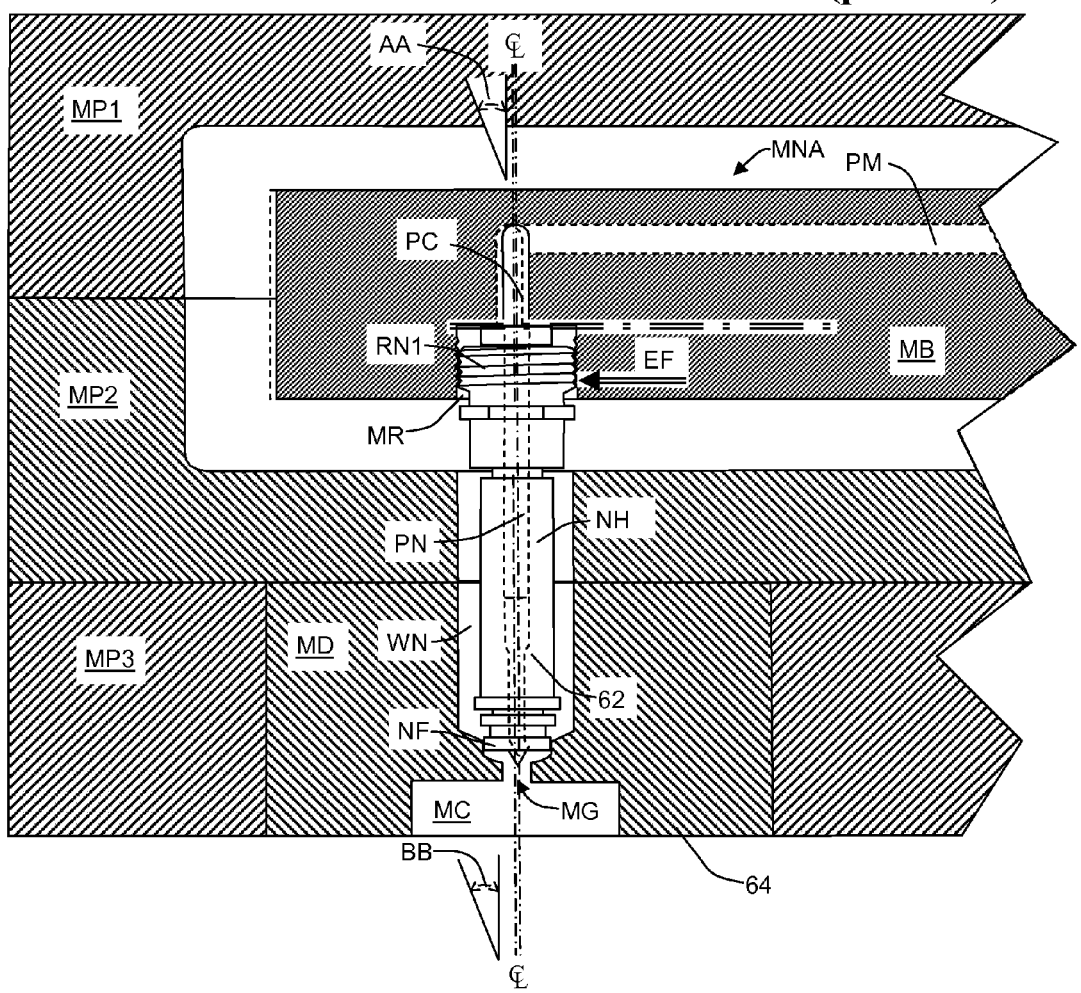
Figure 2:
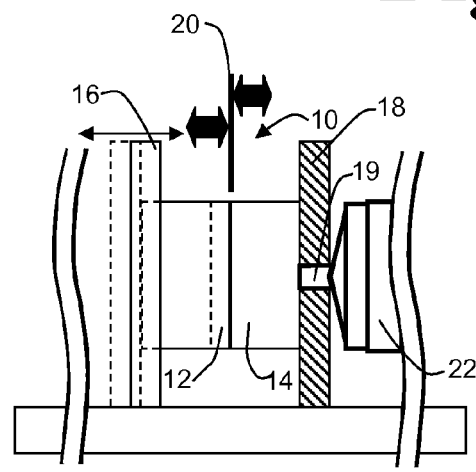
FIG. 2 is a partial cross sectional view of an injection molding clamp and injection unit for molding articles from material supplied from the injection unit to cavities defined by members of a mold assembly.

Referring to FIG. 2, a mold assembly 10 comprises a primary core component 12 and a primary cavity component 14. Primary core component 12 is supported by movable platen 16, and primary cavity component 14 is supported by stationary platen 18. Mold assembly 10 has parting plane (illustrated by line 20) and the primary cavity component 14 and primary core component 12 define at least one mold cavity (not shown) when the mold components are engaged, i.e., when the mold assembly is "closed" so that components 12 and 14 abut at the parting plane. Articles are produced by: (i) filling the mold cavities with material in flowable condition, so-called "melt"; (ii) allowing the melt to solidify; and, (iii) with the mold components separated, i.e., "open", removing the molded articles. Movable platen 16 and stationary platen 18 comprise a press unit of an injection molding machine. Movable platen 16 is moved to open and close mold assembly 10, an open position of movable platen 16 being shown in phantom (dashed line) in FIG. 2. Melt is injected to mold assembly 10 from a nozzle such as nozzle 19 of an injection unit 22, the nozzle passing through an opening of stationary platen 18 as illustrated by the cross-section thereof shown in FIG. 2. Distribution of melt to the mold cavities is advantageously effected by a configuration of conduits and nozzles (not shown in FIG. 2) receiving melt from nozzle 19 and conveying melt through the nozzles to the mold cavities. Primary core component 12 may advantageously comprise a subassembly of members providing support for a core mold die as well as a mechanism and components to dislodge molded articles from the core mold die. Primary cavity component 14 may advantageously comprise a sub-assembly of members providing support for a cavity mold die as well as constructions for conveying melt from injection unit 22 to the mold cavities. Such constructions may advantageously comprise one or more manifold and nozzle assembly constructions effective to distribute melt in a flowable condition at pressures adequate to achieve expeditious and complete filling of the mold cavities.

Figure 3:
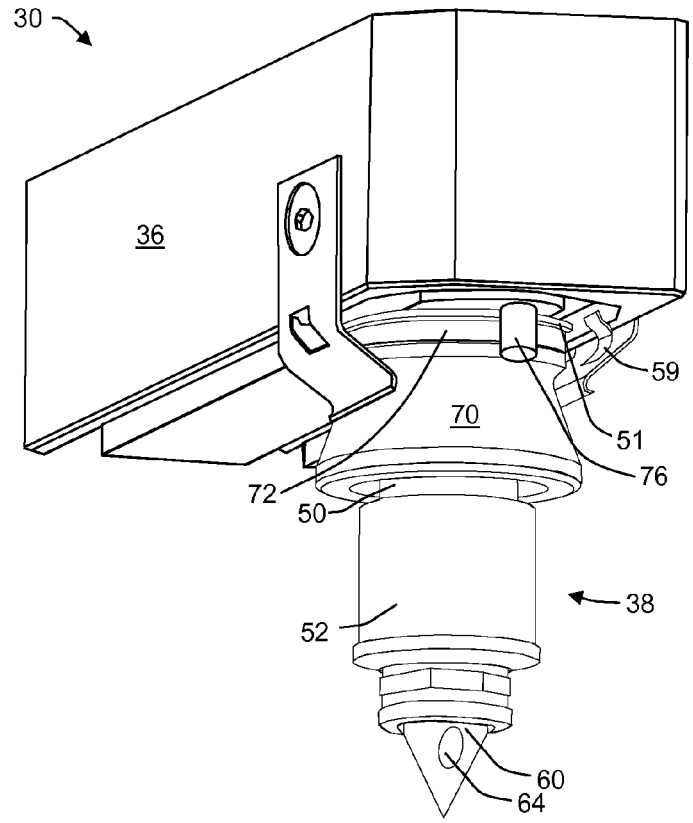
FIG. 3 is a three dimensional view of a manifold and nozzle assembly construction in accordance with the invention.
Figure 4A:
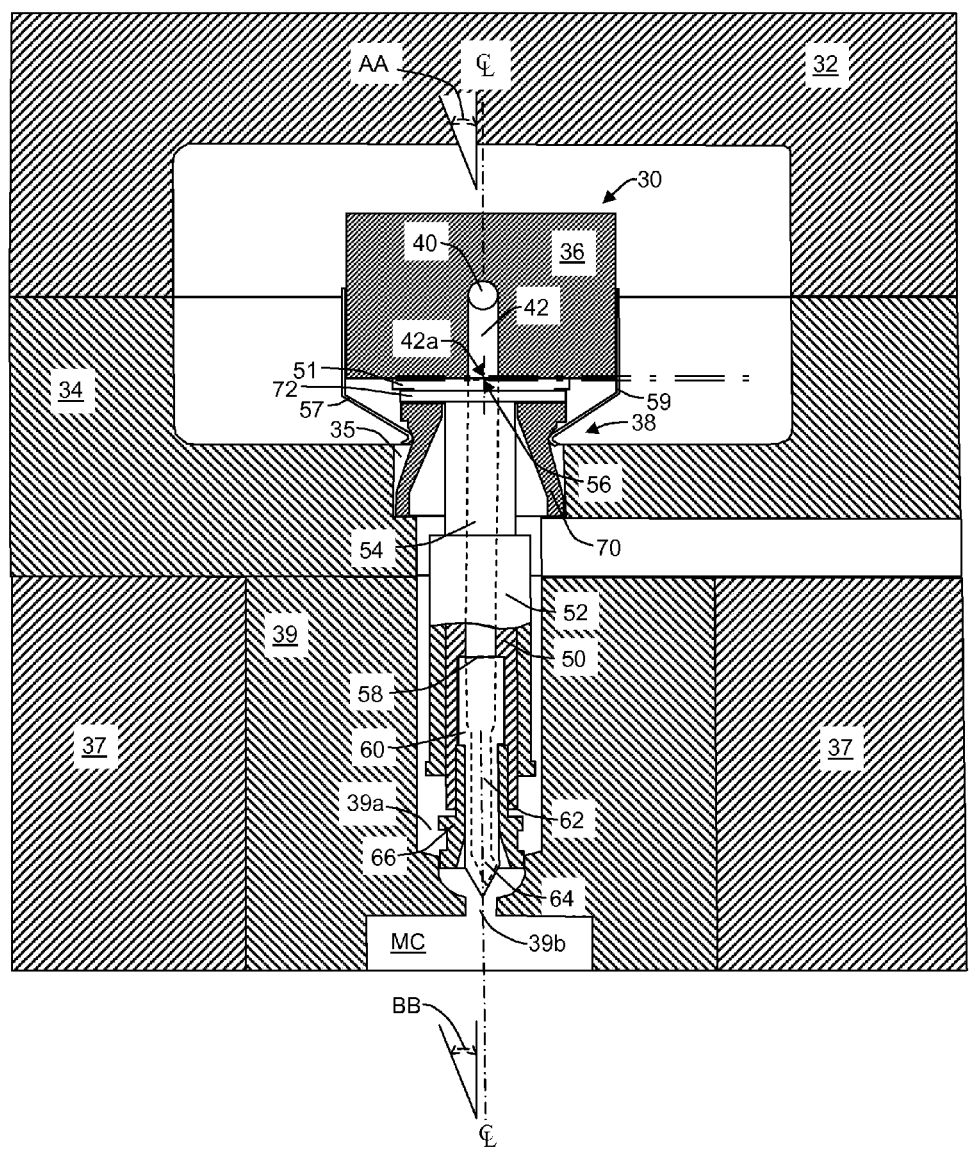
FIGS. 4*a* and 4*b* are partial cross sectional views depicting an arrangement of a manifold, nozzle assembly and retention device in accordance with the invention.

A portion of a manifold and nozzle assembly construction 30 in accordance with the invention is shown in FIGS. 3 and 4a. Advantageously, manifold and nozzle assembly construction 30 is received within a mold assembly component such as mold assembly component 14 of FIG. 2. As illustrated in FIG. 4a, the mold assembly component comprises members including a manifold retainer plate 32, a nozzle retainer plate 34, a mold die retainer plate 37 and a mold die block 39. Manifold and nozzle assembly construction 30 comprises a manifold member such as manifold block 36, and at least one nozzle assembly such as nozzle assembly 38. Manifold and nozzle assembly construction 30 is received in the mold assembly component so that manifold block 36 is supported between manifold retainer plate 32 and nozzle retainer plate 34 so as to minimize contact between manifold block 36 and plates 32 and 34. Nozzle assemblies associated with manifold block 36, such as nozzle assembly 38, are supported in nozzle retainer plate 32 to minimize contact of each nozzle assembly with nozzle retainer plate 32. The outlet of each nozzle assembly is received in an opening, a so-called "well", 39a in a mold die block such mold die block 39. Well 39a is in fluid communication with a mold cavity space such as cavity space MC. Advantageously, heating elements (not shown) are fitted to manifold block 36 to supply heat required to maintain material within manifold block 36 in a flowable condition. Likewise, a heating element such as heater 52 comprising nozzle assembly 38 is effective to maintain melt within nozzle assembly 38 in a flowable condition.

Figure 4B:
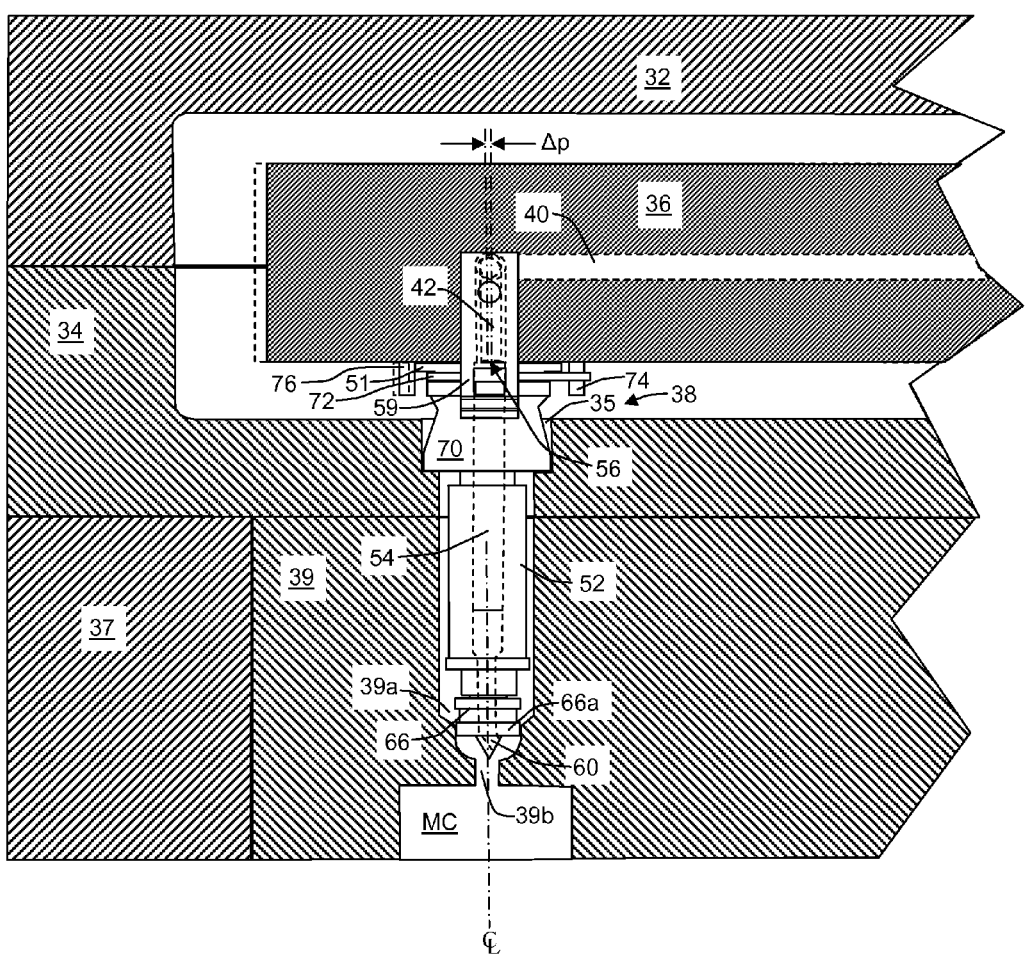

Continuing with reference to FIGS. 3 and 4a, nozzle assemblies such as nozzle assembly 38 are held in abutting contact with manifold block 36 by compressive forces applied through, advantageously, a collar such as collar 70 that surrounds a portion of the head end of the nozzle assembly and engages an inlet end flange thereof such as flange 51. As best seen in FIGS. 4a and 4b an anti-rotation clip 72 is interposed between collar 70 and manifold block 36. Anti-rotation clip 72 engages a flat formed in the head end of nozzle body 50 so that rotation of nozzle body 50 around the longitudinal axis thereof rotates anti-rotation clip 72. A projection of anti-rotation clip 72 engages a dowel attached to manifold block 36 such as dowel 74 (FIG. 4b). By virtue of engagement of anti-rotation clip 72 with dowel 74, rotation of nozzle assembly 38 is prevented. Anti-rotation clip 72 facilitates installation and removal of threadably connected nozzle tips into nozzle assembly 38 with the nozzle assembly installed in a manifold and nozzle assembly construction such as construction 30. Anti-rotation clip 72 is shown interposed between collar 70 and inlet end flange 51 of nozzle body 50. Alternatively, where a nozzle body has an inlet end flange spaced from the inlet end face, an anti-rotation clip may be interposed between that inlet end flange and manifold block 36. As seen in FIGS. 3 and 4b, a locating dowel such as locating dowel 76 is attached to manifold block 36 to establish a locating limit for placement of a nozzle assembly relative to the outlet of the manifold passage. Locating dowel 76 is an aid for assembly of a manifold and nozzle assembly construction. As will be understood from the showing of FIG. 4b, locating dowel 76 will be displaced away from nozzle assembly 38 with thermal expansion of manifold block 36 (change of position shown in phantom (dashed lines) in FIG. 4b).

Continuing with references to FIGS. 3, 4a and 4b, collar 70 is illustrated as a removable collar. Collars such as collar 70 may, alternatively, comprise an integrated element of the head end of a nozzle body. As seen in FIGS. 3, 4a and 4b, collar 70 is received in a stepped bore 35 through nozzle retainer plate 34 and abuts an internal shoulder thereof. By virtue of spacing between the interior step of bore 35 and the opposed face of manifold block 36, collar 70 is elastically compressed in consequence of abutment of nozzle assembly 38 with manifold block 36. Collar 70 exerts a compressive force on nozzle assembly 38 in the direction of manifold block 36 according to the extent of elastic compression of collar 70. That force is sufficient to maintain sealing contact between the inlet end face of nozzle assembly 38 and the abutting face of manifold block 36 under normal operating conditions. The longitudinal centerline of each stepped bore 35 is substantially aligned with the longitudinal centerline of a well 39a so that the longitudinal centerline of each nozzle assembly supported by nozzle retainer plate 32 is substantially aligned with the longitudinal centerline of a well 39a. Advantageously, collar 70 locates nozzle body 50 within bore 35 so that nozzle body 50 is spaced from the internal sidewalls of bore 35, whereby there is no direct contact between nozzle body 50 and the interior of bore 35. Such spacing reduces heat transfer from nozzle assembly 38 to nozzle retainer plate 34 aiding maintenance of a flowable condition of material within nozzle assembly 38.

Manifold block 36 receives melt from injection unit 22 and conveys melt through one or more internal manifold passages such as manifold passage 40 in fluid communication with nozzle assemblies abutted to manifold block 36. In constructions where more than one nozzle assembly is associated with a single manifold passage 40, communicating passages, such as communicating passage 42 convey melt from the manifold passage through a communicating passage outlet 42a to a nozzle assembly inlet. Nozzle assembly 38 advantageously comprises an elongated cylindrical body such as nozzle body 50 through which a melt passage such as nozzle passage 54 communicates with a nozzle inlet 56 and a nozzle outlet 58. As a further advantage, an exit tip such as needle tip 60 is fitted to the outlet end of nozzle body 50 and comprises a tip passage 62 in fluid communication with nozzle passage 54 and tip outlet 64. Advantageously, needle tip 60 is retained in the outlet end of nozzle body 50 by a tip retainer such as tip retaining nut 66 threadably engaged with nozzle body 50. Alternative tip arrangements are known, including tip members that are directly threadably connected to nozzle bodies. Melt flows from the nozzle assemblies such as nozzle assembly 38 through mold cavity opening 39b, a so called "gate", into cavity space MC. Sealing contact is maintained between the forward end of nozzle assembly 38 and sidewalls of well 39a to prevent material from escaping from well 39a. As illustrated in FIG. 4a, that sealing contact is effected by contact of a protruding flange 66a of tip retaining nut 66 with sidewalls of well 39a.

To facilitate pre-installation assembly of a manifold and nozzle assembly construction that permits relative movement of the nozzle assemblies and associated manifold with expected thermal expansion, the invention provides retaining means for retaining nozzle assemblies with a manifold member such as manifold block 36. In particular, a pair of nozzle retaining clips, such as retaining clips 57 and 59 are attached to manifold block 36 and located to engage the head end of a nozzle assembly such as nozzle assembly 38. The clips 57 and 59 need not be effective for maintaining sealing contact between a manifold block and nozzle assembly at normal operating pressures since sealing contact is expected to be maintained by compressive force effected by, for example, a collar such as collar 70. Conversely, clips 57 and 59 do not interfere with intended operation of manifold and nozzle assembly construction 30 in any manner or with relative movement of a manifold block and abutted nozzle assemblies with thermal expansion. Therefore, clips 57 and 59 are left in place after installation of manifold and nozzle assembly construction 30 in a mold component.

Permitted relative movement of a manifold member and associated nozzle assemblies accommodated by nozzle retaining clips in accordance with the invention shall be described with reference to FIG. 4b. Nozzle assembly 38 is held in a fixed position relative to die block 39 in consequence of contact between flange 66a of tip retainer 66 and the sidewall of nozzle well 39a. The inlet end of nozzle assembly 38 is held in abutting contact with manifold block 36 by compressive forces exerted on nozzle assembly 38 by collar 70. Thermal expansion occurs in all directions according to the coefficient of thermal expansion of the material of manifold block 36. In an arrangement where communicating passages 42 are located in the center of width of manifold block 36, thermal expansion of manifold block 36 will not alter the position of communicating passages 42 relative to that center of width. Conversely, with communicating passages spaced along the length of manifold block 36, thermal expansion of the length of manifold block 36 will effect a change of position of communicating passages as indicated in phantom (dashed lines) in FIG. 4b. The magnitude of the change of position is designated "$\Delta p$" as represented by the change of position of the longitudinal centerline of communicating passage 42 in FIG. 4b. It is to be expected that any change of position of nozzle wells 39a with thermal expansion of other members of a mold assembly component will not be of magnitude $\Delta p$. Consequently, with nozzle assembly 38 fixed in location in nozzle well 39a, thermal expansion of manifold block 36 will result in movement of manifold block 36, and communicating passage 42, relative to nozzle assembly 38.

To accommodate expected changes of position of communicating passages relative to nozzle assemblies, manifold and nozzle assembly construction 30 is pre-assembled to locate the longitudinal axes of nozzle assemblies to be aligned with the longitudinal centerlines of wells 39a. Locating dowels such as locating dowel 76 facilitate correct location of nozzle assemblies along the length of manifold block 36. The longitudinal axes of the nozzle assemblies are spaced apart from the longitudinal centerlines of communicating passages 42 at the temperature of pre-assembly by approximately the anticipated change of position $\Delta p$ upon thermal expansion. When installed, nozzle assemblies of manifold and nozzle assembly construction 30 will be precisely located within stepped bores 35 of nozzle retainer plate 34 and within wells 39a of mold die 39. Upon manifold and nozzle assembly construction 30 reaching operating temperature, the position of communicating passages 42 will have changed to align the longitudinal centerlines thereof with the longitudinal centerlines of wells 39a. Because nozzle assemblies are held in fixed location relative to wells 39a, the longitudinal centerlines of the nozzle assemblies will remain substantially aligned with the longitudinal centerlines of wells 39a, whereby, at operating temperature, the inlets 56 (FIG. 4a) of nozzle passages 54 will be substantially concentric with the outlets of communicating passages 42. The contemplated relative movement is effected by sliding of the face of manifold block 36 against the abutting inlet end faces of nozzle assemblies.

Figure 5A:
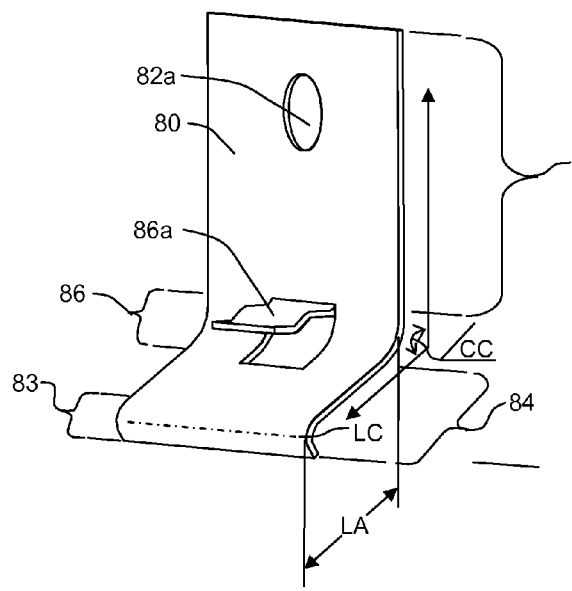
FIGS. 5*a* and 5*b* illustrate a first alternative nozzle retaining clip in accordance with the invention and its engagement with the head end of a nozzle assembly.
Figure 5B:
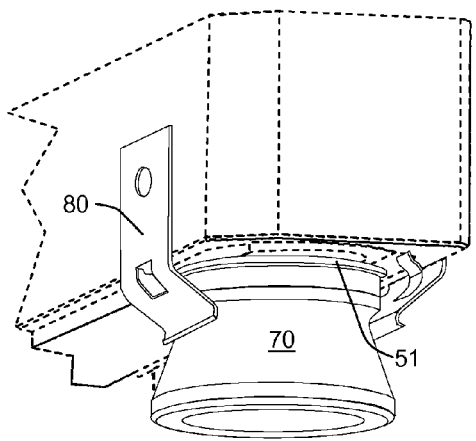

A first alternative design for retaining clips such as retaining clips 57 and 59 shall be described with reference to FIGS. 5a and 5b. It is to be born in mind that both clips of each pair of retaining clips will conform to a single design. Referring to FIG. 5a, retainer clip member 80 comprises attachment portion 82, engagement portion 84 and transition region 86 joining attachment portion 82 with engagement portion 84. Attachment portion 82 advantageously comprises a hole such as through-hole 82a through which the shank of a fastener passes to attach clip member 80 to a side of a manifold block such as manifold block 36 (shown in phantom (dashed) in FIG. 5b). Engagement portion 84 comprises convex contact segment 83 establishing a line (LC) for contact with the head end of a nozzle assembly. Engagement portion 84 is oblique to attachment portion 82, the angle of inclination CC between engagement portion 84 and attachment portion 82 being established by transition region 86. A locating tab 86a is located in transition region 86 so as to abut the lower face of a manifold block when clip member 80 is attached to a manifold block side. When so abutted, locating tab 86a is effective to prevent rotation of clip 80 around the longitudinal centerline of a fastener shank passing through hole 82a. The angle of inclination CC of engagement portion 84 to attachment portion 82 together with the length LA of engagement portion 84 determines the location of contact line LC relative to the location of locating tab 86a and hence relative to the lower face of a manifold block. As best seen in FIG. 5b, contact segment 83 of the clip design of FIG. 5a contacts collar 70 of a nozzle assembly in a transition region between a top cylindrical segment abutting a flange 51 of a nozzle body and a tapered segment terminating proximate the lower end of collar 70. As contact segment 83 presents a convex surface facing a nozzle assembly, contact line LC determines the location of contact of contact segment 83 with, for example, collar 70. As best seen in FIG. 5b, the aforesaid transition region of collar 70 presents a curved contour facing contact segment 83. In consequence of contact of the facing curved surfaces of the retainer clip member and collar, point contact is established between contact segment 83 and collar 70. Advantageously, clip member 80 is somewhat resilient so that with a pair of retaining clips engaging a nozzle assembly and attached to opposite sides of a manifold block, the engagement portions 84 are elastically displaced and exert sufficient force on a nozzle assembly at opposed points of contact to overcome gravitational force acting on a nozzle assembly so that the forces exerted solely by the clips are effective to retain the nozzle assembly with the manifold block.

Figure 6A:
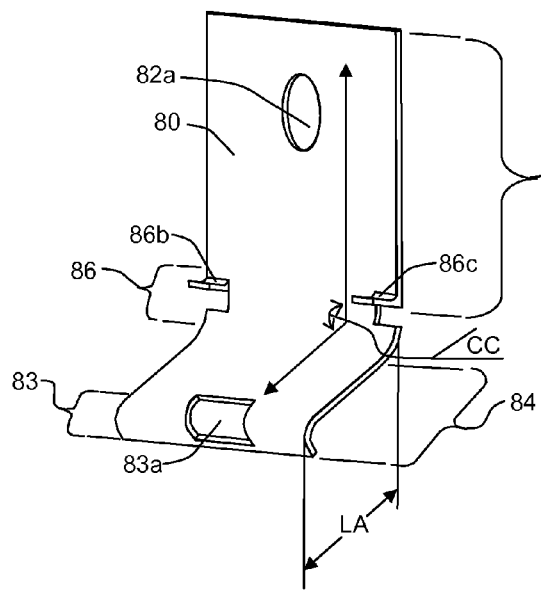
FIGS. 6*a* and 6*b* illustrate a second alternative nozzle retaining clip in accordance with the invention and its engagement with the head end of a nozzle assembly.
Figure 6B:
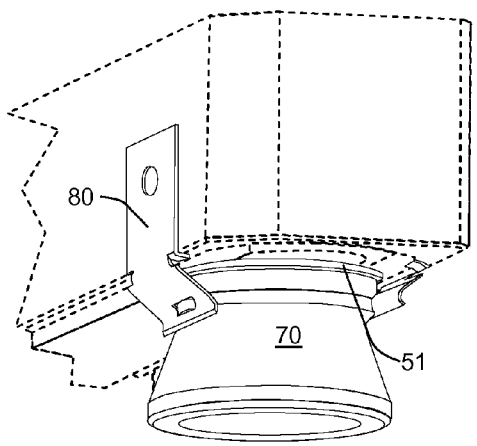

A second alternative design for retaining clips such as retaining clips 57 and 59 shall be described with reference to FIGS. 6a and 6b. Common elements of the designs depicted in FIGS. 5a and 6a are designated by the same reference numbers. Referring to FIG. 6a, a pair of locating tabs 86b and 86c are located at clip peripheral edges of the transition region 86 and abut the lower face of a manifold block when clip member 80 of FIG. 6a is attached to a manifold block side. Locating tabs 86b and 86c function in the same manner as locating tab 86a of FIG. 5a to prevent rotation of clip 80. An open slot 83a through contact segment 83 permits protrusion of a portion of a periphery of a mold assembly head end as best illustrated in FIG. 6b. By virtue of the magnitude of angle of inclination CC and the length LA of engagement portion 84, open slot 83a is advantageously located relative to locating tabs 86b and 86c (and hence, to the lower face of a manifold block) so as to engage a peripheral portion of a top cylindrical segment of a collar 70 of a nozzle assembly. With a pair of retaining clips 80 of FIG. 6a engaging a nozzle assembly, the head end is "captured" by open slots 83a to resist displacement of the nozzle assembly relative to the manifold block across the width of the retaining clips. Hence, use of retaining clips in accordance with the design of FIG. 6a provides increased resistance to displacement of nozzle assemblies of a manifold and nozzle assembly construction as might otherwise occur in the course of handling and installation of that construction.

Although the preferred embodiments illustrate nozzle assemblies comprising separate collars, an integral collar element comprising the so-called "head" of a nozzle body is recognized as an alternative construction suitable for use with clips in accordance with the invention. It is only necessary that the head end of a nozzle assembly comprise external surfaces suitable for engagement by a pair of nozzle retaining clips disposed to engage opposite sides of the nozzle assembly so as to be effective to retain the nozzle assembly with a manifold member.

What is claimed is:

1. A nozzle retaining clip for retaining a nozzle assembly with a material distributing manifold to facilitate installation of a pre-assembled construction of a manifold and nozzle assembly in a mold assembly component, the manifold comprising a manifold member comprising a manifold passage for conveying material in a flowable condition, each nozzle assembly comprising a nozzle passage there-through for conveying material from the manifold passage to a mold cavity, the nozzle retaining clip comprising an attachment portion by which the clip is attached to the manifold member and an engagement portion for engaging a nozzle assembly abutted to the manifold member, wherein a pair of clips are locatable so that the respective engagement portions thereof engage opposite sides of a nozzle assembly abutted to the manifold member so as to allow the manifold member and nozzle assembly to move relative to one another while the engagement portions of the clips remain engaged with the nozzle assembly.

2. The nozzle retaining clip according to claim 1 wherein the clip is sufficiently resilient so that when a pair of clips attached to a manifold member engage a nozzle assembly between the engagement portions thereof, at least the engagement portions thereof are elastically displaced so as to accommodate the nozzle assembly therebetween and exert sufficient force on the nozzle assembly to be effective to retain the nozzle assembly with the manifold member.

3. The nozzle retaining clip according to claim 2 further comprising a transition region joining the attachment portion and engagement portion, the attachment portion and engagement portion being oblique one to the other and wherein at least the transition region and engagement portion of the clip is sufficiently resilient so that when a pair of clips attached to a manifold member engage a nozzle assembly therebetween, at least the engagement portions thereof are elastically displaced to accommodate the nozzle assembly and exert sufficient force on the nozzle assembly to be effective to retain the nozzle assembly with the manifold member.

4. The nozzle retaining clip according to claim 3 further comprising at least one locating tab for contacting a surface of the manifold member so as to restrain movement of the attachment portion relative to the manifold member.

5. The nozzle retaining clip according to claim 3 wherein the clip engagement portion further comprises a contact segment curving convexly in the direction of intended contact with a nozzle assembly so as to define a line of contact where the engagement portion will engage a nozzle assembly.

6. The nozzle retaining clip according to claim 5 further comprising at least one locating tab for contacting a surface of the manifold member so as to restrain movement of the attachment portion relative to the manifold member.

7. The clip according to claim 5 wherein the contact segment further comprises an open slot bridging the line of contact, the slot effective to permit protrusion of a segment of a nozzle assembly at least partially through the contact segment.

8. The nozzle retaining clip according to claim 7 further comprising at least one locating tab for contacting a surface of the manifold member so as to restrain movement of the attachment portion relative to the manifold member.

9. An apparatus for injection molding comprising a material distributing manifold, at least one nozzle assembly and at least one pair of nozzle retaining clips for retaining at least one nozzle assembly with the manifold, the nozzle assembly being held in abutting contact with the manifold by the pair of clips so that the nozzle assembly and manifold can move relative to each other while abutted and while the nozzle retaining clips remain engaged with the nozzle assembly.

10. The apparatus of claim 9 wherein each nozzle retaining clip of a pair of clips is attached to the material distributing manifold by at least one fastener fixing the clip in place on an external sidewall of the manifold and the clip is constructed so as to engage a portion of the head end of a nozzle assembly when the nozzle assembly is abutted to the outlet surface of the manifold.

11. The apparatus of claim 10 wherein each nozzle retaining clip is sufficiently resilient so that when a pair of such clips attached to a manifold member engage a nozzle assembly therebetween, at least the engagement portions thereof are elastically displaced to accommodate the nozzle assembly and exert sufficient force on the nozzle assembly to be effective to retain the nozzle assembly with the manifold member.

12. The apparatus of claim 11 wherein each nozzle retaining clip further comprises at least one locating tab for contacting a surface of the manifold member so as to restrain movement of the attachment portion relative to the manifold member.

13. The apparatus according to claim 11 wherein the clip engagement portion further comprises a contact segment curving convexly in the direction of intended contact with a nozzle assembly so as to define a line of contact where the engagement portion will engage a nozzle assembly.

14. The apparatus of claim 13 wherein each nozzle retaining clip further comprises at least one locating tab for contacting a surface of the manifold member so as to restrain movement of the attachment portion relative to the manifold member.

15. The apparatus of claim 13 wherein each nozzle retaining clip of a pair of clips comprises a slot bridging the line of contact and located to engage a segment of a cylindrical head portion of a nozzle assembly abutted to the manifold so as to resist dislodgment of the nozzle assembly from the manifold.

16. The apparatus of claim 15 wherein each nozzle retaining clip further comprises at least one locating tab for contacting a surface of the manifold member so as to restrain movement of the attachment portion relative to the manifold member.

* * * * *